(12) United States Patent
Tosti et al.

(10) Patent No.: US 9,100,135 B2
(45) Date of Patent: Aug. 4, 2015

(54) METHOD AND DEVICE FOR PACKET NETWORK SYNCHRONIZATION

(75) Inventors: Massimiliano Tosti, Rome (IT); Simona Morrone, Rome (IT); Rosanna Carleo, Rome (IT); Ondrej Wisniewski, Genzano di Roma (IT); Matteo Giuli, Cortona (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 657 days.

(21) Appl. No.: 13/125,434

(22) PCT Filed: Oct. 24, 2008

(86) PCT No.: PCT/EP2008/009035
§ 371 (c)(1),
(2), (4) Date: Jul. 26, 2011

(87) PCT Pub. No.: WO2010/045961
PCT Pub. Date: Apr. 29, 2010

(65) Prior Publication Data
US 2011/0274124 A1 Nov. 10, 2011

(51) Int. Cl.
*H04J 3/06* (2006.01)
*H04L 12/24* (2006.01)
*H04L 12/26* (2006.01)

(52) U.S. Cl.
CPC ............ *H04J 3/0667* (2013.01); *H04L 41/142* (2013.01); *H04L 43/0864* (2013.01); *H04L 43/106* (2013.01); *H04L 43/16* (2013.01)

(58) Field of Classification Search
None
See application file for complete search history.

(56) References Cited

U.S. PATENT DOCUMENTS

| 7,103,124 | B1* | 9/2006 | Lindskog et al. | 375/354 |
| 2003/0123491 | A1* | 7/2003 | Couillard | 370/508 |

(Continued)

FOREIGN PATENT DOCUMENTS

EP   1785802 A1   5/2007

OTHER PUBLICATIONS

The International Telegraph and Telephone Consultive Committee, "Timing requirements at the outputs of primary reference clocks suitable for plesiochronous operation of international digital links", Series G: Transmission Systems and Media, Digital Systems and Networks, Design objectives for digital networks, Nov. 1988, pp. 1-10, Recommendation G.811, Melbourne, International Telecommunication Union.

(Continued)

*Primary Examiner* — Gregory Sefcheck
*Assistant Examiner* — Suk Jin Kang
(74) *Attorney, Agent, or Firm* — Coats & Bennett, PLLC

(57) ABSTRACT

A method is described for synchronizing a clock of a client in a packet based communication network with respect to a reference time provided by a timeserver. Packets containing at least one timestamp indicating a sending time of the packet are sent from the timeserver and received at the client. Upon arrival of each packet at the client, the arrival time is determined and the delay between the timestamp and the arrival time is also determined for a first plurality of packets. A first variation of the delays of these packets is calculated and based on this calculation a first observation frame is defined whose size depends on the first variation of the packet delays. The first observation frame comprises a second plurality of delays associated with the first plurality of delays. Further, a first representative delay based on the second plurality of delays is determined. Based on the first representative delay a relation between the clock of the client and the reference time is calculated and the clock of the client is synchronized to the reference time based on the calculated relation.

24 Claims, 7 Drawing Sheets

(56) References Cited

U.S. PATENT DOCUMENTS

| | | | |
|---|---|---|---|
| 2003/0142696 A1* | 7/2003 | Holmeide et al. | 370/508 |
| 2005/0041692 A1 | 2/2005 | Kallstenius | |
| 2008/0080567 A1* | 4/2008 | Radulescu | 370/516 |
| 2008/0089364 A1* | 4/2008 | Barry et al. | 370/517 |
| 2008/0225897 A1* | 9/2008 | Bryant et al. | 370/503 |
| 2009/0086764 A1* | 4/2009 | Lee et al. | 370/503 |
| 2009/0147806 A1* | 6/2009 | Brueckheimer | 370/503 |
| 2009/0265352 A1* | 10/2009 | Holenstein et al. | 707/8 |
| 2009/0276542 A1* | 11/2009 | Aweya et al. | 709/248 |
| 2010/0080248 A1* | 4/2010 | Aweya et al. | 370/503 |
| 2010/0118895 A1* | 5/2010 | Radulescu | 370/503 |
| 2011/0243156 A1* | 10/2011 | Aweya et al. | 370/476 |
| 2013/0282875 A1* | 10/2013 | Aweya et al. | 709/219 |
| 2014/0029604 A1* | 1/2014 | Nicholls et al. | 370/350 |

OTHER PUBLICATIONS

Mills, D., "Network Time Protocol (Version 3) Specification, Implementation and Analysis", Network Working Group Request for Comments: 1305, Mar. 1992, pp. 1-120.

Mills, D., "Simple Network Time Protocol (SNTP) Version 4 for IPv4, IPv6 and Osi", Network Working Group Request for Comments: 4330, Category: Informational, Jan. 2006, pp. 1-27.

* cited by examiner

METHOD AND DEVICE FOR PACKET NETWORK SYNCHRONIZATION

TECHNICAL FIELD

The present invention relates to a method for synchronizing the clock of a client in a packet based communication network. A device embodying the invention is also described.

BACKGROUND

Network synchronization has gained increasing importance in telecommunications throughout the last thirty years. There are many examples where network synchronization is required to guarantee quality of service. The introduction of Ethernet networks and the growing number of networks which combine packet and circuit switched architectures have introduced new problems and new technical challenges concerning synchronization quality.

Network synchronization is a generic concept that represents a way of distributing common time and frequency references to all the nodes of a network, in order to align their respective time and frequency scales. The effect of poor synchronization in a telecommunications network has a direct influence on the provided services. Digital switching equipment, for example, must be synchronized to avoid clock slips. The effect of these clock slips on the network traffic is dependent on the application; they have often little effect on plain voice services but have major impact on circuit data services. Synchronization in Time Division Multiplexing (TDM) networks is implemented distributing a reference timing signal which is traceable to a Primary Reference Clock using the physical layer as the carrier.

In order to distribute the timing over a packet network, packet based methods have been developed. In these cases the timing information is extracted from data packets. The packet delay variation introduced by the packet network is often a critical aspect which influences the quality of communication. In UMTS Terrestrial Radio Access Networks (UTRAN) where the architecture is based on the Internet Protocol (IP), the distribution of the synchronization function is performed e.g. by extracting the required synchronization information from the IP packets.

There are three main approaches known in synchronization distribution via packet based methods: the filling jitter buffer method, the periodic packet transmission method and the delay packet fitting method.

The filling jitter buffer method is based on the construction of a software buffer filled by incoming packets that are received at the server dispatching frequency and emptied at the receiving node clock frequency. Every n samples, the average dimension of the buffer is calculated. If the average dimension is above or below the buffer boundaries, the receiving node clock is corrected accordingly.

The periodic packet transmission method is based on a periodic packet transmission between the server and the client node. From this a priori known periodicity it is possible to calculate the frequency drift and the time offset of the client node with respect to the server by measuring the time delay experienced at the client at each packet arrival.

The filling jitter buffer method and the periodic packet transmission method are based on the analysis of the packet arriving frequency. This makes them highly sensitive to packet loss. In fact the loss of packets makes the buffer shorter or doubles the interleaving time between one packet and the following, leading to a wrong frequency correction. Highly controlled networks are therefore required. It must be also noted that accuracy is proportional to observation time.

The delay packet fitting method relies on time differences measured between a timeserver and a client. A network protocol is used to carry timestamps in order to compare the local oscillator frequency to a precise reference clock. The Network Time Protocol (NTP) will be used as an example for distributing timekeeping among a set of distributed time servers and clients. The NTP is not a requirement for the delay packet fitting method but any other equivalent protocol could be used as well.

The NTP is described in the Request for Comments (RFC) 1305 of the Internet Engineering Task Force (IETF).

In the NTP a timestamp message is sent from the client to the timeserver. When sending the message, the client inserts a time $t_1$ in the message. The timeserver receives the message and adds the local time $t_2$ to the message. The message is sent back at time $t_3$ and is received by the client again at $t_4$. The message comprises these timestamps. In this way, the timeserver does not need to keep track of all nodes for synchronization.

The client collects a suitable number of packets, calculates the delays $\Delta t_{43}=t_4-t_3$, and, in case of round-trip measurements, $\Delta t_{21}=t_2-t_1$, and then from either of these delays it is able to calculate the drift and offset of the clock. From the measured delay values a graph of delay $\Delta t$ vs time t can be derived. The drift and offset of the clock is calculated from a time difference line fitted to a number of delays values. There are many methods which can be used to obtain a straight line from the measured delays. One of them is the least squares algorithm which has a relatively long convergence time. Another is the minimum delay algorithm which may have a shorter convergence time. A combination of the least squares algorithm and the minimum delay algorithm can also be used.

In the case of the least squares algorithm acceptable frequency predictions are possible only after a long observation period: if high accuracy is required a long convergence time is expected. The convergence time depends on the time difference of the measured packet delays. The minimum delay algorithm makes use of two minimum delay values received in two moments, one far away in time from the other. The time difference line is then determined by these two points. Of course the drawback of this method is that its accuracy depends on the quality of the two points used to get the time-difference line.

All the methods described above have a common disadvantage. They are difficult to manage and they require high accuracy measurements which are not always possible in packet based networks. High network load or other disturbances may influence negatively the accuracy of the described methods.

SUMMARY

It is an object of the present invention to obviate the above disadvantages and provide an advantageous method for synchronizing the clock of a client in a packet based communication network.

A method for synchronizing a clock of a client in a packet based communication network with respect to a reference time provided by a timeserver is proposed. Packets sent from the timeserver are received at the client and each packet contains at least one timestamp indicating a sending time of the packet from the server. Upon arrival of each packet at the client, the arrival time is determined, and the delay between the timestamp and the arrival time is also determined. When this is performed for a first plurality of packets, a first variation of the delays of these packets is calculated and based on this calculation a first observation frame is defined. The size of the first observation frame depends on the first variation of the packet delays. The first observation frame comprises a second plurality of delays associated with the first plurality of delays. Further, a first representative delay based on the second plurality of delays is determined. Based on the first representative delay a relation between the clock of the client and the reference time is calculated. Finally the clock of the client is synchronized to the reference time based on the calculated relation.

Furthermore, the invention can be embodied in a device for synchronizing a clock of a client in a packet based communication network with respect to a reference time provided by a timeserver. The device comprises a receiver for receiving packets from the timeserver. The packets comprise a timestamp.

Further the device comprises means for determining an arrival time for each packet at the client. The device also comprises a processor which is adapted to determine a delay between the timestamp and the arrival time for each packet. The processor is also adapted to calculate a first variation for a first plurality of the delays and to calculate a relation between the clock of the client and the reference time. The processor comprises a frame calculator which is adapted to control a size of a first observation frame associated with the first plurality of delays. The size of the first observation frame depends on the first delay variation and the first observation frame comprises a second plurality of delays associated with the first plurality. The processor is further adapted to determine a first representative delay based on the second plurality of delays. The device further comprises a synchronizer which is adapted to synchronize the clock of the client based on the calculated relation between the clock of the client and the reference time.

The method can also be embodied in a program which is, for example, stored on a data carrier or loadable into a processing system of a device.

The device can also be implemented in a client which can be, for example, a node in a telecommunication network.

The proposed method and devices allow an advantageous synchronization of the clock of a client in a packet based communication network, avoiding the disadvantage of low accuracy of methods proposed in the prior art.

The foregoing and other objects, features and advantages of the present invention will become more apparent in the following detailed description of preferred embodiments as illustrated in the accompanying drawings.

DETAILED DESCRIPTION

Figure 1:
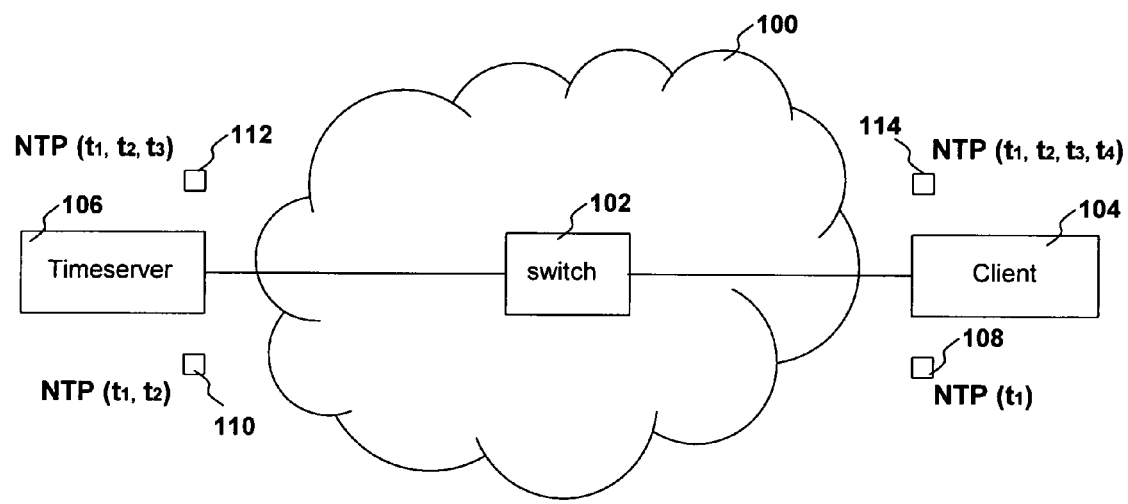
FIG. 1 shows a client-server synchronization configuration

FIG. 1 shows a client—server configuration in a packet based network (100) which can contain one or more switches (102) for forwarding packets from the client to the server and vice versa. The client—server configuration can be used for round-trip time measurements from the client (104) towards a remote timeserver (106). A network protocol e.g. NTP is used so that packets sent from the client (104) to the server (106) carry timestamps in order to compare the clock of the client (104) to a reference clock in the timeserver (106). The client (104) requests an update of time, and the timeserver (106) responds to this request.

The client (104) inserts a time $t_1$ when it sends a packet (108) to the timeserver (106). The packet carries the timestamp $NTP(t_1)$. The timeserver (106) receives the packet (110) and attaches to it the local time $t_2$ of arrival, thus the packet carries the timestamps $NTP(t_1, t_2)$. The packet (112) is sent back at time $t_3$, carrying the timestamps $NTP(t_1, t_2, t_3)$ and is received by the client at time $t_4$. In the end the packet (114) carries timestamps $NTP(t_1, t_2, t_3, t_4)$. This procedure is done for a number of packets and the delay $\Delta t_{43} = t_4 - t_3$ or $\Delta t_{21} = t_2 - t_1$ or both can be calculated. Both the frequency of the client (104) and time offset can be calculated having as a reference the clock of the timeserver (106) using this client—server configuration. An equation giving the frequency drift ρ is:

$$\rho = (fs - fc)/fc \qquad (1)$$

where fs is the frequency of the clock of the server (106) and fc is the frequency of the clock of the client (104). The frequency of the clock of the client (104) can be easily calculated if the drift ρ is known, since the frequency of the server (106) is known.

From equation (1) providing the frequency drift ρ it can be derived that, for example, the delay $\Delta t_{43}$ is:

$$\Delta t_{43} = t_{min} + \beta + (\rho \cdot t_4 + t_{offset}) \qquad (2)$$

The term $t_{min} + \beta$, is a real time delay experienced when sending a packet (108) from the timeserver (106) to the client (104). The term $t_{min}$ is the minimum physical time it takes for a packet (108) to reach from the client (104) to the server (106) or vice versa. The term $t_{offset}$ is the offset between the clock of the client (104) and the clock of the server (106). The term β represents a variable delay in the network (100) (e.g. due to queuing). Equation (2) suggests that a plot of $\Delta t_{43}$ vs. $t_4$ can be described by a straight line with slope ρ and with an intercept with the y-axis of $t_{min} + \beta + t_{offset}$.

If the packets do not experience any variable delay in the network (100) then the delay $\Delta t_{43}$ is:

$$\Delta t_{43,min} = \Delta t_{43}(\beta 0) = t_{min} + (\rho \cdot t_4 + t_{offset}) \qquad (3)$$

This equation suggests that a plot of $\Delta t_{43}$ vs. $t_4$ can be described by a straight line with slope ρ and with an intercept with the y-axis of $t_{min} + t_{offset}$.

Figure 2:
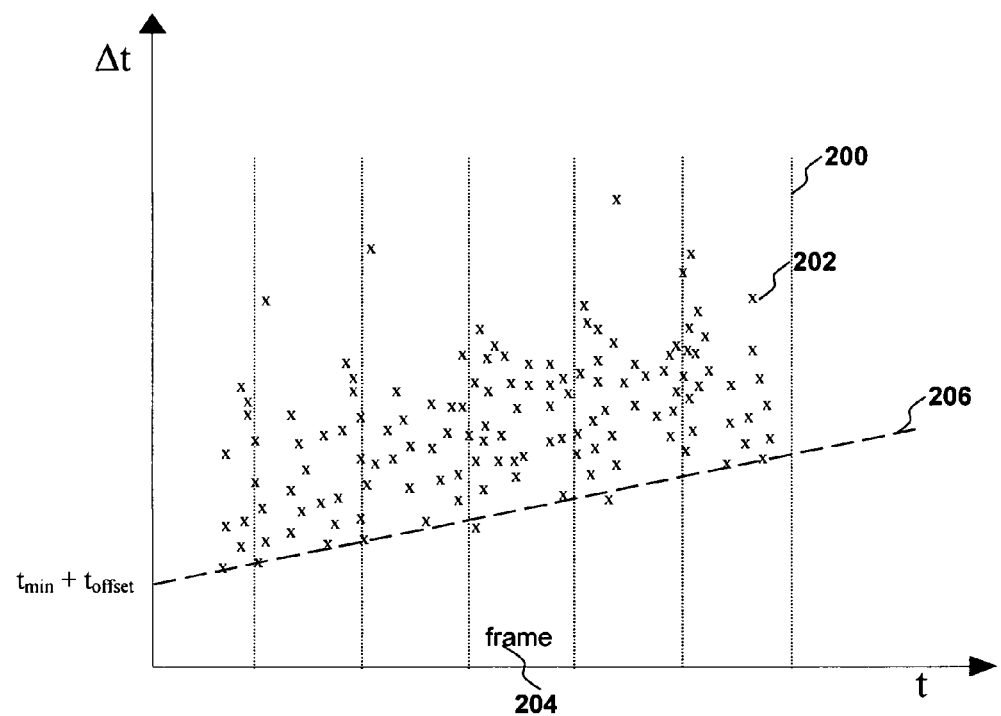
FIG. 2 shows a graph of measured delays of packets exchanged between a client and a server over a period of time and fixed size observation frames.

FIG. 2 shows a graph of measured delays (202) of packets exchanged between a client and a server over a period of time. As explained before, the drift of the client clock can be described by a straight line with slope ρ and an intercept with the y-axis at $t_{min} + t_{offset}$. In order to be able to calculate the slope ρ and the intercept of the line (206) the position with respect to the delays has first to be determined.

For fitting a line to a number of delays, the time period during which packet delays (202) are collected is divided into a number of equal size time frames (204). In FIG. 2 the vertical lines (200) serve the purpose of representing the equal size time frames (204) as presented in the prior art. One minimum delay is defined in each time frame (204) and a line (206) is fitted to these minimum delays. Based on the assumption that the variable delay β for the minima is close to zero, a line connecting the minima as a good approximation of equation (3). The slope of this line (206) can thus give the drift of the client clock. Unpredictable parameters, for example sudden changes in network load, can influence the measurement of the minimum delays. Also the distribution of these delays may make the fitting of a line difficult. Due to these reasons the calculation of the slope and further the calculation of the drift of the client clock may be quite sensitive to external parameters and thus not an easy and accurate procedure.

Figure 3:
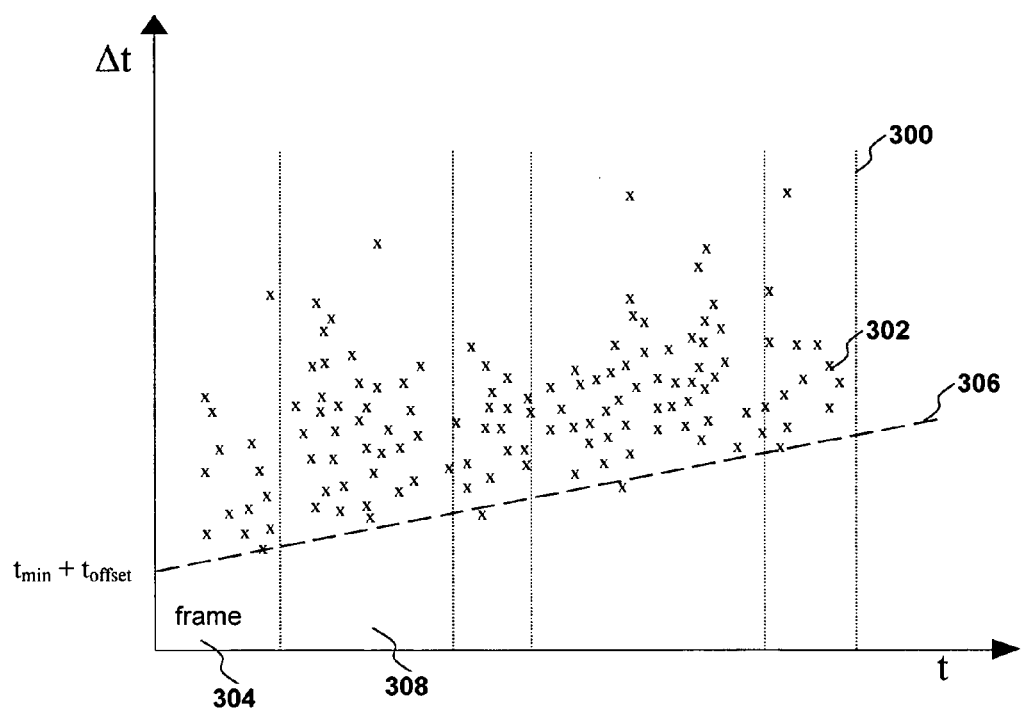
FIG. 3 shows a graph of measured delays of packets exchanged between a client and a server over a period of time and variable size observation frames.

A solution to the problem described above is presented in FIG. 3. Observation frames (304) of variable size are used. One example for an observation frame is a time frame. However, the size of an observation frame can also be defined in another way, e.g. as a number of received packets, so that the size of the chosen frame relates to the number of delays collected in the frame. The lines (300) serve the purpose of representing the variable size observation frames. A larger observation frame improves the filtering of the delays, i.e. the probability increases that the observation frame comprises a delay with a value of β close to zero or, in more general terms, a delay giving a good representative value for the observation frame. For example, if the representative value for the observation frame is a minimum, the purpose is to not take into account the delays (302) which have a high variable delay. On the other hand, smaller observation frames have the advantage that the time to determine a representative value decreases and the effect of the drift of the client clock on the representative value is also reduced. Thus a general purpose of the method is to determine a size of the observation frame adapting to the present network conditions.

A general idea is that the size of the observation frames (304) is feedback controlled. One approach for adapting the observation frame takes into account the maximum delay variation for calculating the size of the observation frames (304) and, in this example, the size of each observation frame is dependent on the maximum variation of the measured delays e.g. included in the previous observation frame. In case it is observed that the maximum delay variation is stable the frequency of observation frame adaptation may be reduced.

A formula for calculating the size of the observation frames (304) can be of the form:

$$\text{Framesize} = f(\Delta t\max) + \text{framesize}_{min} \quad (4)$$

A minimum size for a frame, framesize$_{min}$, is defined so that, in case the observed maximum delay variation and the term f(Δtmax) in equation (4) is very small or zero, there is still an available observation frame within which a representative delay can be found. Function f in equation (4) should be chosen such that the delay variation has a direct effect on the size of the observation frame and generally increases with the delay variation.

Apart from the maximum delay variation, other measures for a delay variation can be used for the calculation of the size of the observation frames. An advantage of using a maximum delay variation is that it is easy to measure. In general however, the object of determining the delay variation is to set the observation frame to a size which allows determining a sufficiently good representative delay for the frame.

The description made until now is based on the delay of packets between the sending time at the timeserver and the arrival at the client. Alternatively or in addition, delays can also be determined using other timestamps in the packets, e.g. the sending time at the client and the arrival time at the timeserver. Also from such delays a correction from a clock may be determined. This applies also to the description of the following embodiments.

Figure 4:
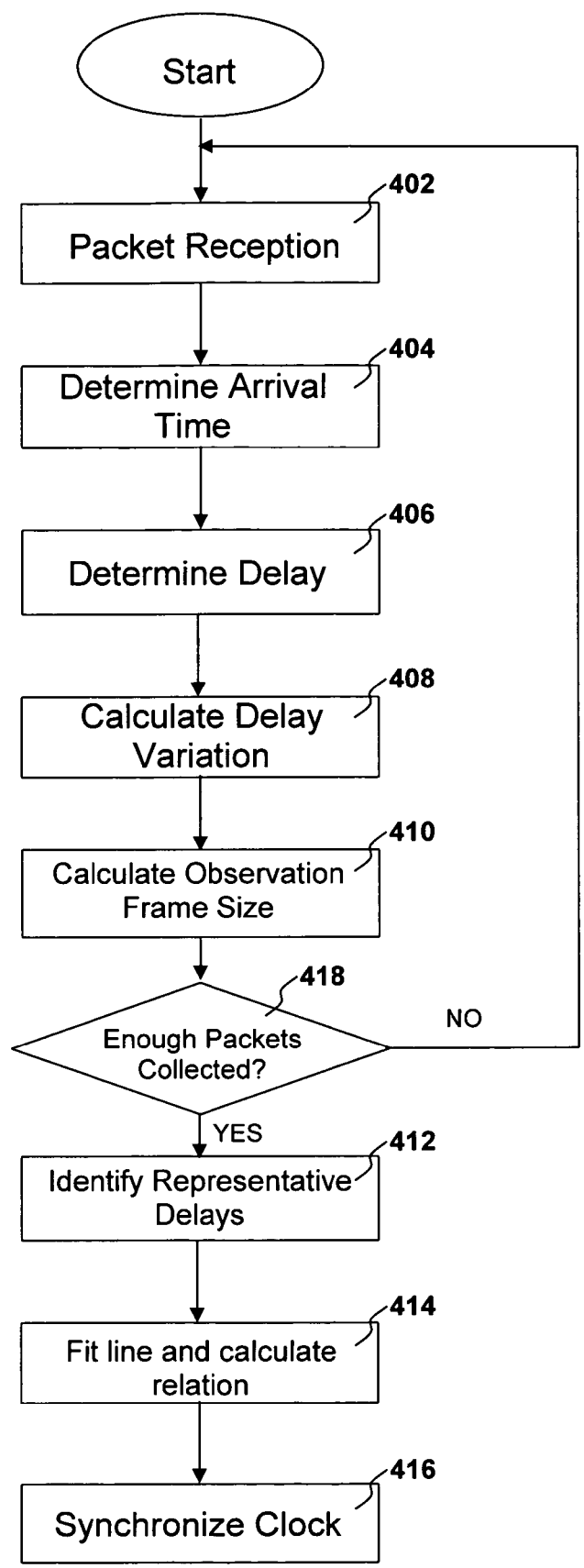
FIG. 4 shows a flow diagram of the proposed method

FIG. 4 shows a flow diagram of the proposed method. The method begins in step (402) by receiving a number of packets e.g. a first plurality of packets, at the client coming from the timeserver. For example, packets are sent from the client to the server with the request to be sent back from the server to the client and each contain one or more timestamps which can indicate when the packet was sent from the client to the server, when it arrived at the server and/or when it was sent from the server to the client. In step (404) the arrival time for each packet is determined at the client. For each packet, a delay between the timestamp indicating the sending of the packet from the server to the client and the arrival time is determined in step (406).

In step (408), having already determined the delay for a number of packets in step (406), a variation of these delays is calculated. For example, the calculation of the maximum variation of the delays can be done by calculating the difference between the longest and the shortest delays. The method to calculate the frame size can additionally consider the statistical distribution of delays which may vary due to network characteristics (e.g. load) and topology. Depending on these parameters the measured packet delays could have, for example, an exponential or normal statistical distribution. Therefore the statistical distribution of the measured delays may optionally be also determined, e.g. in step (408).

As explained above, the delays are evaluated using observation frames which subdivide the collected delays into different groups for evaluation. Having determined the variation of the collected delays in step (408), which may be a first or a further plurality of delays, the size of a first observation frame is calculated in step (410). In an embodiment, the size of the observation frame is associated with the first or the further plurality of delays in the sense that it is proportional to the maximum variation of these delays. The size of the first observation frame defines the number of packet delays which have to be collected. For example, if the calculation of the first observation frame results in a frame containing 50 packets, then a second plurality of delays i.e. of delays of 50 further packets arriving from the server will have to be collected.

The notion of a frame containing a number of packets is based on the assumption that the size of an observation frame can relate to the number of delays collected in the frame, as mentioned before.

In step (418), a control is performed in order to check e.g. if enough delays are collected for the further execution of the method. The number of delays is considered adequate if the interpolation of the representative delays, is resulting in a clock synchronization meeting the precision requirements: the higher the precision required the higher the number of required samples. If the collected delays are not adequate the process described starting from step (402) is performed again by receiving a number of packets from the server. This number is the number of packets contained in the last calculated observation frame. This loop is repeated for a number of times e.g. for ten times. In the end, in the case of the example of ten times, ten observation frames have been calculated and identified on a graph of the measured delays over time.

If the control in step (418) shows that the collected delays are enough for the execution of the method, one representative delay in each frame is identified in step (412). A representative delay can be, for example, the minimum delay in each observation frame. Having identified a number of representative delays in step (412), a line can be fit, in step (414), to the representative delays by using a line fitting algorithm e.g. a least squares algorithm in case of a straight line. The slope of the line, optionally also an intercept with an axis of the coordinate system, is calculated in step (414) and indicates the relation of the client clock to that of the server clock as described with respect to equation (1). Having calculated the relation of the client clock to that of the server clock, the clock of the client can be synchronized to the clock of the server in step (416).

Figure 5A:
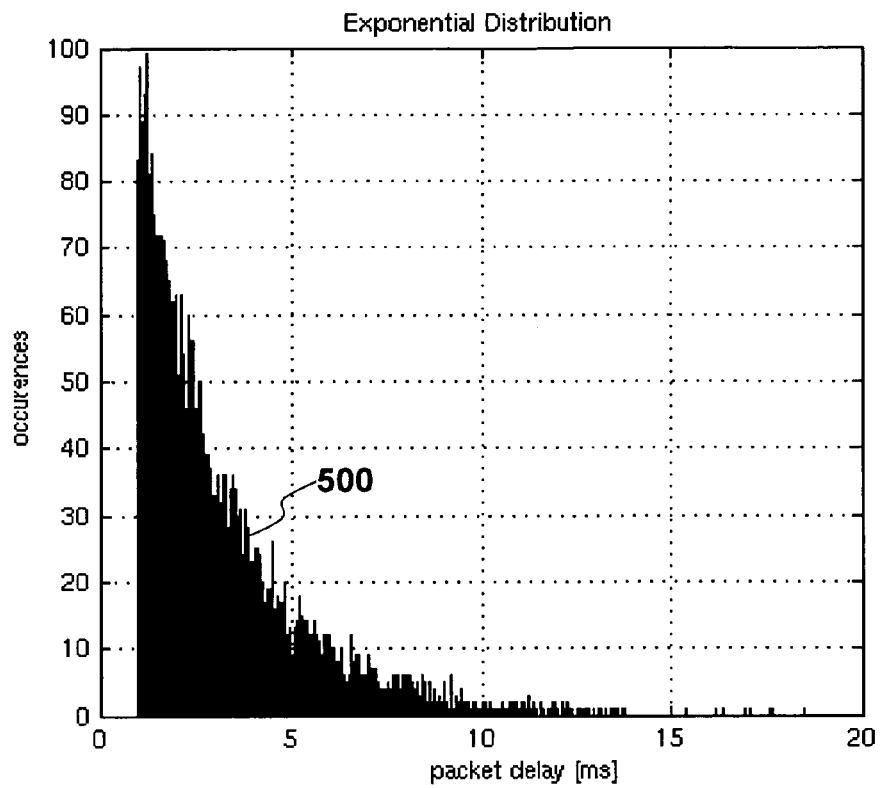
FIG. 5a shows an exponential distribution of packet delays

FIG. 5a shows a graph of an exponential distribution (500) of measured delays. The x-axis indicates the packet delay values and the y-axis the occurrences of values of the measured delays. In this example there is a higher occurrence of packet delays of up to about 5 ms than of packet delays of 5 ms up to 20 ms. It has been mentioned above that the model for calculating the observation frame size may depend on the statistical distribution of the measured delays. In an embodiment the size of the observation frame approximates the complement of the statistical distribution. In the case of the exponential distribution shown in FIG. 5a a suitable function for calculating the size may be of the form:

$$\text{Framesize} = k * \exp(\Delta \max) + j \quad (5)$$

The constant k can adapt the size of the observation frame if, for example, a small frame is required so that it does not take a long time to collect packet delays. The constant j adapts the size of the observation frame in particular if the maximum delay variation measured is small.

Figure 5B:
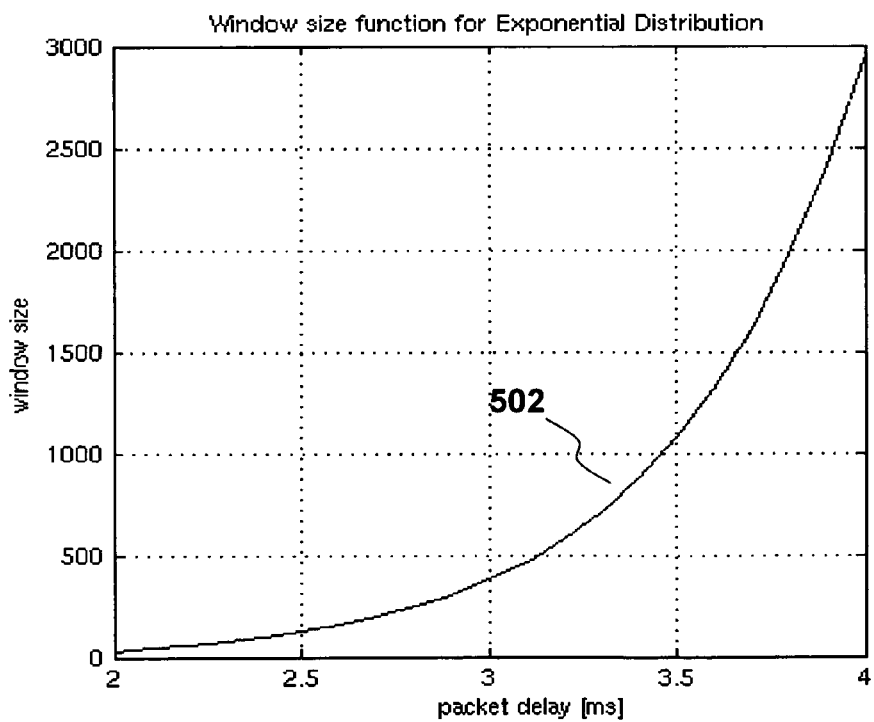
FIG. 5b shows a graphical representation of the function for calculating the size of the observation frames for the exponential distribution

In FIG. 5b a graphical representation of eq. (5) is shown. The frame size is named "window size" in the figure and refers to the number of packets which are included inside the calculated frame. The purpose of having a function which approximates the complement of the statistical distribution is the following. The delay distribution is representing a process that is correlated. That means that in order to be able to maximize the possibility to have a minimum delay (the highest stable delay for this distribution) into the next frame, it's needed to define a wider observation frame when the measured delay variation is higher. On the contrary, when the delay variation is lower it is easier to have a minimum delay into the next observation frame and it is also possible to define the observation frames quicker by using narrower frames. This increases the possibility of finding a delay with small absolute variation with respect to the minimum inside every observation frame. The correlation between network load and delay variation applied to each of the collected packet delays ensures that the filtering of the delays is more efficient when the collected delays are the ones lying on the lower delay part of the shown statistical distribution.

Figure 6A:
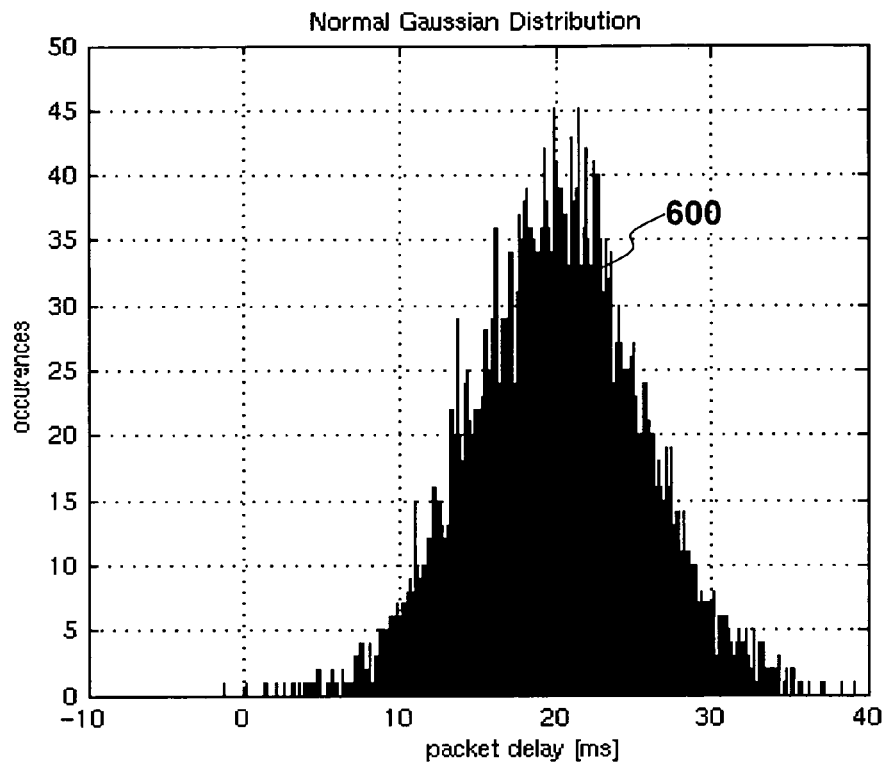
FIG. 6a shows a normal Gaussian distribution of packet delays

FIG. 6a shows another example of a statistical distribution of measured delays over a period of time. In this case the distribution is a normal Gaussian distribution (600). Such a distribution may occur due to another network topology or different operating conditions. As in the preceding example, the formula for calculating the observation frame size should approximate the complement of this statistical distribution. In this case the complement of the function describing the normal Gaussian distribution may be chosen, e.g.:

$$\text{Winsize} = k*(\Delta \max - \mu)^2 + j \quad (6)$$

Again, the constant k can adapt the size of the observation frame if, for example, a small frame is required so that it does not take a long time to collect packet delays. The constant j adapts the size of the observation frame in particular if the maximum delay variation measured is small. The constant $\mu$ is the mean value of the distribution.

Figure 6B:
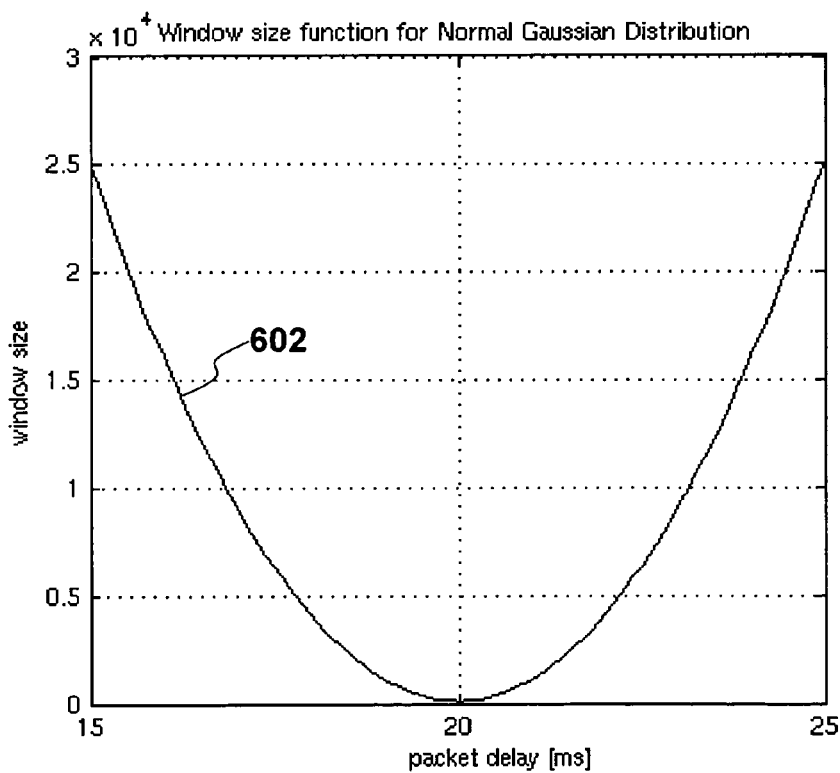
FIG. 6b shows a graphical representation of the function for calculating the size of the observation frames for the normal Gaussian distribution

FIG. 6b shows a graphical representation (602) of function (6). Also in FIG. 6b the frame size is named "window size" in the figure and refers to the number of packets which are included inside the calculated frame. In this case the purpose of having a function which approximates the complement of the statistical distribution is also that by choosing a bigger observation frame for packet delays which have a lower occurrence we manage to include more delays in the frame and thus increase the possibility of having a delay with small variation with respect to the more stable delay value inside the window, in this case the mean value. The difference to the exponential distribution is that for the normal Gaussian distribution delays with small variation are not the minimum but the mean delays due to the symmetry of the Gaussian distribution. In this case a line would have to be fitted to the mean delays.

Figure 7:
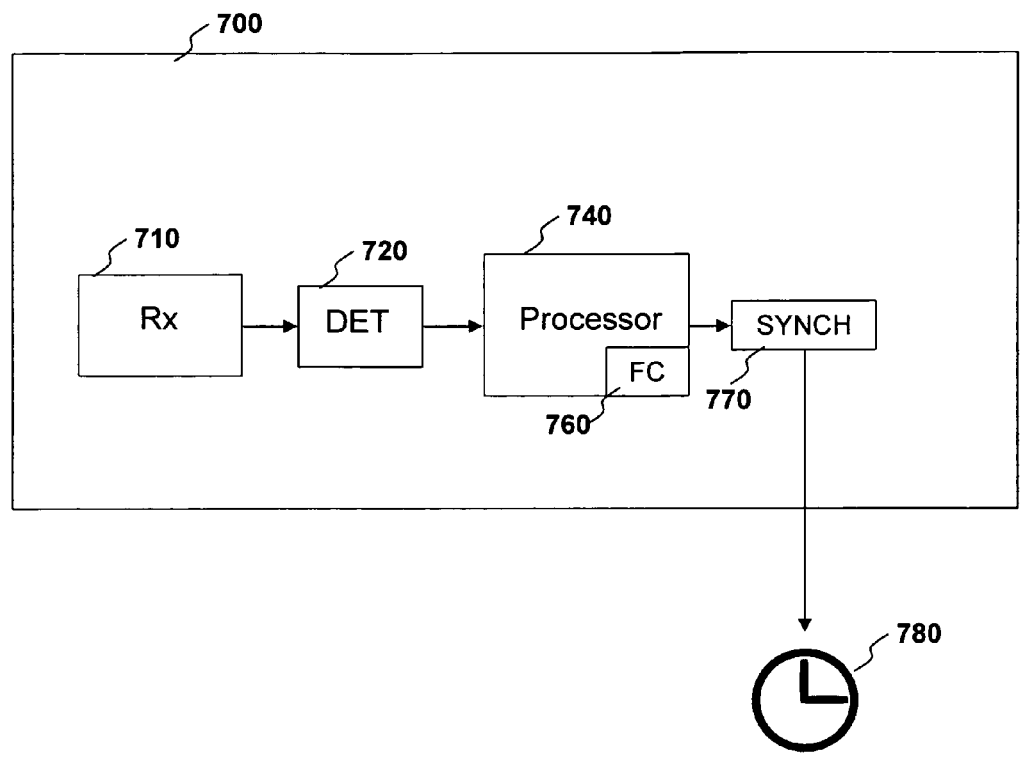
FIG. 7 shows a device which is adapted to perform the proposed method.

The invention can also be embodied in a device which can be adapted to perform any embodiments of the method as described above. An embodiment of such a device is shown in FIG. 7. The device (700) comprises a receiver (710) for receiving packets coming from a timeserver. The packets contain timestamps for indicating e.g. a time of sending from the timeserver to the client. The device (700) further comprises means (720) for determining the arrival time of each packet at the client. The means (720) can be a controller which registers and/or stores the value of the client clock when the packet arrives. In other embodiments the means (720) can be a reading unit which reads a timestamp e.g. for the arrival of the packet at the timeserver, is the arrival time evaluated is said arrival time.

The device (700) also comprises a processor (740) which is adapted to determine the delay between the arrival time of each packet and the timestamp indicating the sending time from the timeserver. The processor (740) is also adapted to calculate a variation of the received delays. A relation between the client clock and the reference time is also calculated by the processor (740). The processor (740) further comprises a frame calculator (760) which is adapted to control the size of the observation frames based on the delay variation. The device (700) further comprises a synchronizer (770) which is adapted, taking as input from the processor (740) the calculated relation between the client clock and the reference time, to synchronize the client clock (760).

Such a device could, for example, be implemented in or next to a client, e.g. a router or a node in a telecommunication network.

The above embodiments admirably achieve the objects of the invention. However, it will be appreciated that departures can be made by those skilled in the art without departing from the scope of the invention which is limited only by the claims.

The invention claimed is:

1. A method for synchronizing a clock of a client in a packet based communication network with respect to a reference time provided by a timeserver, the method comprising:
   receiving packets from the timeserver at the client, each packet containing at least one timestamp indicating a sending time of the packet,
   determining an arrival time for each packet;
   determining a delay between the timestamp and the arrival time for each packet;
   calculating a first delay variation for a first plurality of the delays;
   defining a first observation frame associated with the first plurality of the delays, wherein a size of the first observation frame depends on the first delay variation and wherein the first observation frame comprises a second plurality of delays associated with the first plurality of the delays;

determining a representative delay based on the second plurality of delays, by determining a minimum or mean delay from among the second plurality of delays;

calculate a further delay variation for a third plurality of the delays;

define a further observation frame associated with the third plurality of delays, wherein a size of the further observation frame depends on the further delay variation and wherein the further observation frame comprises a fourth plurality of delays associated with the third plurality of the delays;

determine a further representative delay based on the fourth plurality of delays, by determining a minimum or mean delay from among the fourth plurality of delays;

calculating a relation between the clock of the client and the reference time based on the representative delay and also based on the further representative delay, wherein the relation comprises a frequency drift and/or time offset between the clock of the client and the reference time, and wherein calculating the relation comprises calculating the relation from a time difference line fitted to the representative delays; and synchronizing the clock of the client based on the calculated relation.

2. The method according to claim 1, wherein the determined arrival time for each packet is the arrival time of said packet at the client.

3. The method according to claim 1, wherein the size of the first observation frame has a minimum value.

4. The method according to claim 1, wherein the calculated first delay variation is the maximum variation of the first delays.

5. The method according to claim 1, wherein a statistical analysis of the first plurality of delays provides a distribution function of the delays and wherein the size of the first observation frame is defined based on the distribution function.

6. The method according to claim 5, wherein said defining comprises calculating the size of the first observation frame using an equation that is a complement of the distribution function.

7. The method according to claim 1, wherein the representative delay is a minimum delay in the first observation frame.

8. The method according to claim 1, wherein the representative delay is a mean delay in the first observation frame.

9. The method of claim 1, further comprising checking whether a certain number of delays have been collected, and wherein the representative delay and the further representative delay are determined in response to having collected the certain number of delays.

10. A device configured to synchronize a clock of a client in a packet based communication network with respect to a reference time provided by a timeserver, the device comprising:

a receiver configured to receive packets comprising a timestamp from the timeserver, a processor configured to:
 determine a delay between the timestamp and an arrival time for each packet,
 calculate a first delay variation for a first plurality of the delays;
 control a size of a first observation frame associated with the first plurality of delays, wherein the size of the first observation frame depends on the first delay variation and wherein the first observation frame comprises a second plurality of delays associated with the first plurality of the delays,
 determine a first representative delay based on the second plurality of delays, by determining a minimum or mean delay from among the second plurality of delays; and
 calculate a further delay variation for a third plurality of the delays;
 define a further observation frame associated with the third plurality of delays, wherein a size of the further observation frame depends on the further delay variation and wherein the further observation frame comprises a fourth plurality of delays associated with the third plurality of the delays;
 determine a further representative delay based on the fourth plurality of delays, by determining a minimum or mean delay from among the fourth plurality of delays; and
 calculate a relation between the clock of the client and the reference time based on the first representative delay and also based on the further representative delay, wherein the relation comprises a frequency drift and/or time offset between the clock of the client and the reference time, and wherein calculating the relation comprises calculating the relation from a time difference line fitted to the representative delays, and a synchronizer configured to synchronize the clock of the client based on the calculated relation between the clock of the client and the reference time.

11. The device according to claim 10, wherein the determined arrival time for each packet is the arrival time of said packet at the client.

12. The device according to claim 10, wherein the size of the first observation frame has a minimum value.

13. The device according to claim 10, wherein the calculated first delay variation is the maximum variation of the first delays.

14. The device according to claim 10, wherein a statistical analysis of the first plurality of delays provides a distribution function of the delays and wherein the size of the first observation frame is defined based on the distribution function.

15. The device according to claim 14, wherein the processor is configured to calculate the size of the first observation frame using an equation that is a complement of the distribution function.

16. The device according to claim 10, wherein the representative delay is a minimum delay in the first observation frame.

17. The device according to claim 10, wherein the representative delay is a mean delay in the first observation frame.

18. The device of claim 10, wherein the processor is configured to check whether a certain number of delays have been collected, and wherein the representative delay and the further representative delay are determined in response to having collected the certain number of delays.

19. A client comprising a device configured to synchronize a clock of the client in a packet based communication network with respect to a reference time provided by a timeserver, the device comprising:

a receiver configured to receive packets comprising a timestamp from the timeserver, a processor configured to:
 determine a delay between the timestamp and an arrival time for each packet,
 calculate a first delay variation for a first plurality of the delays;

control a size of a first observation frame associated with the first plurality of delays, wherein the size of the first observation frame depends on the first delay variation and wherein the first observation frame comprises a second plurality of delays associated with the first plurality of the delays, determine a first representative delay based on the second plurality of delays, by determining a minimum or mean delay from among the second plurality of delays;

calculate a further delay variation for a third plurality of the delays;

define a further observation frame associated with the third plurality of delays, wherein a size of the further observation frame depends on the further delay variation and wherein the further observation frame comprises a fourth plurality of delays associated with the third plurality of the delays;

determine a further representative delay based on the fourth plurality of delays, by determining a minimum or mean delay from among the fourth plurality of delays; and calculate a relation between the clock of the client and the reference time based on the first representative delay and also based on the further representative delay, wherein the relation comprises a frequency drift and/or time offset between the clock of the client and the reference time, and wherein calculating the relation comprises calculating the relation from a time difference line fitted to the representative delays, and a synchronizer configured to synchronize the clock of the client based on the calculated relation between the clock of the client and the reference time.

20. The client of claim 19, wherein the processor is configured to check whether a certain number of delays have been collected, and wherein the representative delay and the further representative delay are determined in response to having collected the certain number of delays.

21. A computer program product stored on a non-transitory computer readable medium and comprising computer program code that, when executed by a processor of a device associated with a client in a packet based communication network, cause the device to synchronize a clock of the client with respect to a reference time provided by a timeserver, the computer program code causing the device to:

receive packets from the timeserver at the client, each packet containing at least one timestamp indicating a sending time of the packet, determine an arrival time for each packet;

determine a delay between the timestamp and the arrival time for each packet;

calculate a first delay variation for a first plurality of the delays;

define a first observation frame associated with the first plurality of the delays, wherein a size of the first observation frame depends on the first delay variation and wherein the first observation frame comprises a second plurality of delays associated with the first plurality of the delays;

determine a representative delay based on the second plurality of delays, by determining a minimum or mean delay from among the second plurality of delays;

calculate a further delay variation for a third plurality of the delays;

define a further observation frame associated with the third plurality of delays, wherein a size of the further observation frame depends on the further delay variation and wherein the further observation frame comprises a fourth plurality of delays associated with the third plurality of the delays;

determine a further representative delay based on the fourth plurality of delays, by determining a minimum or mean delay from among the fourth plurality of delays;

calculate a relation between the clock of the client and the reference time based on the representative delay and also based on the further representative delay, wherein the relation comprises a frequency drift and/or time offset between the clock of the client and the reference time, and wherein calculating the relation comprises calculating the relation from a time difference line fitted to the representative delays; and synchronize the clock of the client based on the calculated relation.

22. The computer program product of claim 21, the computer program code causes the device to check whether a certain number of delays have been collected, and wherein the representative delay and the further representative delay are determined in response to having collected the certain number of delays.

23. A method for synchronizing a clock of a client in a packet based communication network with respect to a reference time provided by a timeserver, the method comprising:

receiving packets from the timeserver at the client, each packet containing at least one timestamp indicating a sending time of the packet, determining an arrival time for each packet;

determining a delay between the timestamp and the arrival time for each packet;

calculating a first delay variation for a first plurality of the delays;

defining a first observation frame associated with the first plurality of the delays, wherein a size of the first observation frame depends on the first delay variation and wherein the first observation frame comprises a second plurality of delays associated with the first plurality of the delays;

wherein calculating the first delay variation comprises calculating the first delay variation as a function of a plurality of delays determined from packets received during a previous observation frame that precedes the first observation frame, wherein the second plurality of delays are determined from packets received during the first observation frame;

determining a representative delay based on the second plurality of delays, by determining a minimum or mean delay from among the second plurality of delays;

calculating a relation between the clock of the client and the reference time based on the representative delay, wherein the relation comprises a frequency drift and/or time offset between the clock of the client and the reference time, and wherein calculating the relation comprises calculating the relation from a time difference line fitted to the representative delay and at least one other delay; and synchronizing the clock of the client based on the calculated relation.

24. A device configured to synchronize a clock of a client in a packet based communication network with respect to a reference time provided by a timeserver, the device comprising:

a receiver configured to receive packets comprising a timestamp from the timeserver, a processor configured to:
- determine a delay between the timestamp and an arrival time for each packet,
- calculate a first delay variation for a first plurality of the delays;
- control a size of a first observation frame associated with the first plurality of delays, wherein the size of the first observation frame depends on the first delay variation and wherein the first observation frame comprises a second plurality of delays associated with the first plurality of the delays,
- determine a first representative delay based on the second plurality of delays, by determining a minimum or mean delay from among the second plurality of delays; and
- calculate a relation between the clock of the client and the reference time based on the first representative delay, wherein the relation comprises a frequency drift and/or time offset between the clock of the client and the reference time, and wherein calculating the relation comprises calculating the relation from a time difference line fitted to the first representative delay and at least one other delay, and a synchronizer configured to synchronize the clock of the client based on the calculated relation between the clock of the client and the reference time;

wherein the processor is configured to calculate the first delay variation as a function of a plurality of delays determined from packets received during a previous observation frame that precedes the first observation frame, wherein the second plurality of delays are determined from packets received during the first observation frame.

* * * * *

UNITED STATES PATENT AND TRADEMARK OFFICE
CERTIFICATE OF CORRECTION

PATENT NO. : 9,100,135 B2
APPLICATION NO. : 13/125434
DATED : August 4, 2015
INVENTOR(S) : Tosti et al.

It is certified that error appears in the above-identified patent and that said Letters Patent is hereby corrected as shown below:

On the title page, item 75 under "Inventors", in Column 1, Line 5, delete "Cortona" and insert
-- Cortona (Arezzo) --, therefor.

In the specification

In Column 4, Line 57, delete "$\Delta t_{43,min}=\Delta t_{43}(\beta 0)=t_{min}+(\rho \cdot t_4+t_{offset})$" and insert
-- $\Delta t_{43,min}=\Delta t_{43}(\beta=0)=t_{min}+(\rho \cdot t_4+t_{offset})$ --, therefor.

Signed and Sealed this
Twenty-second Day of March, 2016

Michelle K. Lee
*Director of the United States Patent and Trademark Office*